(12) United States Patent
Lee et al.

(10) Patent No.: US 9,878,688 B2
(45) Date of Patent: Jan. 30, 2018

(54) PRETENSIONER

(75) Inventors: Kyung Sang Lee, Gyeonggi-do (KR);
Yo Sun Hong, Gyeonggi-do (KR);
Jong Keun Lee, Gyeonggi-do (KR)

(73) Assignee: WOOSHIN SAFETY SYSTEMS CO., LTD., Gyeonggi-Do (KR)

( * ) Notice: Subject to any disclaimer, the term of this patent is extended or adjusted under 35 U.S.C. 154(b) by 0 days.

(21) Appl. No.: 13/883,855

(22) PCT Filed: Oct. 21, 2011

(86) PCT No.: PCT/KR2011/007894
§ 371 (c)(1),
(2), (4) Date: May 7, 2013

(87) PCT Pub. No.: WO2012/070775
PCT Pub. Date: May 31, 2012

(65) Prior Publication Data
US 2013/0219887 A1 Aug. 29, 2013

(30) Foreign Application Priority Data
Nov. 23, 2010 (KR) .................. 10-2010-0116787

(51) Int. Cl.
*B60R 22/46* (2006.01)
*B60R 22/19* (2006.01)
*B60R 22/195* (2006.01)

(52) U.S. Cl.
CPC ........ *B60R 22/4628* (2013.01); *B60R 22/195* (2013.01); *B60R 22/1951* (2013.01);
(Continued)

(58) Field of Classification Search
CPC ............ B60R 22/1951; B60R 22/1952; B60R 22/4633; B60R 22/195; B60R 22/4676; B60R 22/4628; B60R 2022/4661
(Continued)

(56) References Cited

U.S. PATENT DOCUMENTS 2,371,267 A * 3/1945 Schwarz ...................... 74/10.39
5,794,876 A * 8/1998 Morizane ............ B60R 22/4633
242/374
(Continued)

FOREIGN PATENT DOCUMENTS

JP 09290707 A * 11/1997
JP 2000-313311 11/2000
(Continued)

OTHER PUBLICATIONS

English Language machine translation of JP409290707.*
(Continued)

*Primary Examiner* — Mark Laurenzi
*Assistant Examiner* — Wesley Harris
(74) *Attorney, Agent, or Firm* — RatnerPrestia

(57) ABSTRACT

A pretensioner for introducing a webbing wound in a spool by explosive power obtained by exploding gunpowder when an impact is applied from the outside, the pretensioner includes: a hollow cylinder having one side surface for inserting a portion of a pinion connected to the spool; a micro gas generator (MGG) mounted in an upper end portion of the cylinder and for transferring explosive power into the cylinder while gunpowder provided at the inside explodes when an impact is applied from the outside; a rack mounted in a length direction at the inside of the cylinder and having one end portion disposed toward the MGG and having the other end portion disposed opposite to the pinion and having gear teeth provided in one side surface separated not to engage with the pinion before receiving explosive power from the MGG; and a roller for receiving explosive power from the MGG and rotatably mounted at the other side surface opposite to one side surface of the cylinder in which a portion of the pinion is inserted so that the gear teeth of the rack engage with the pinion when the rack falls toward (Continued)

a lower end portion of the cylinder and for guiding the separated rack to move toward the pinion.

14 Claims, 7 Drawing Sheets

(52) U.S. Cl.
CPC ...... *B60R 22/1952* (2013.01); *B60R 22/4633* (2013.01); *B60R 22/4676* (2013.01); *B60R 2022/4661* (2013.01)

(58) Field of Classification Search
USPC .................................. 280/606, 806; 60/632
See application file for complete search history.

(56) References Cited

U.S. PATENT DOCUMENTS

| | | | |
|---|---|---|---|
| 6,155,727 A * | 12/2000 | Wier | 297/480 |
| 6,299,090 B1 * | 10/2001 | Specht et al. | 242/374 |
| 6,435,440 B1 * | 8/2002 | Hori | 242/374 |
| 6,697,677 B2 * | 2/2004 | Dahl et al. | 607/128 |
| 6,698,677 B1 * | 3/2004 | Happ | B60R 22/4633 |
| | | | 242/374 |
| 7,793,982 B2 * | 9/2010 | Krauss | 280/806 |
| 2002/0005640 A1 | 1/2002 | Nagata et al. | |
| 2002/0134876 A1 * | 9/2002 | Ono et al. | 242/374 |
| 2012/0138611 A1 * | 6/2012 | Stevens et al. | 220/89.2 |

FOREIGN PATENT DOCUMENTS

| | | |
|---|---|---|
| JP | 2009-274649 | 11/2009 |
| KR | 10-2006-0054684 | 5/2006 |
| KR | 10-0779112 | 11/2007 |

OTHER PUBLICATIONS

Notice of Allowance for Korean Patent Application No. KR 10-2010-0116787 dated Jun. 12, 2012.
International Search Report for PCT/KR2011/007894 dated Jun. 11, 2012.

* cited by examiner

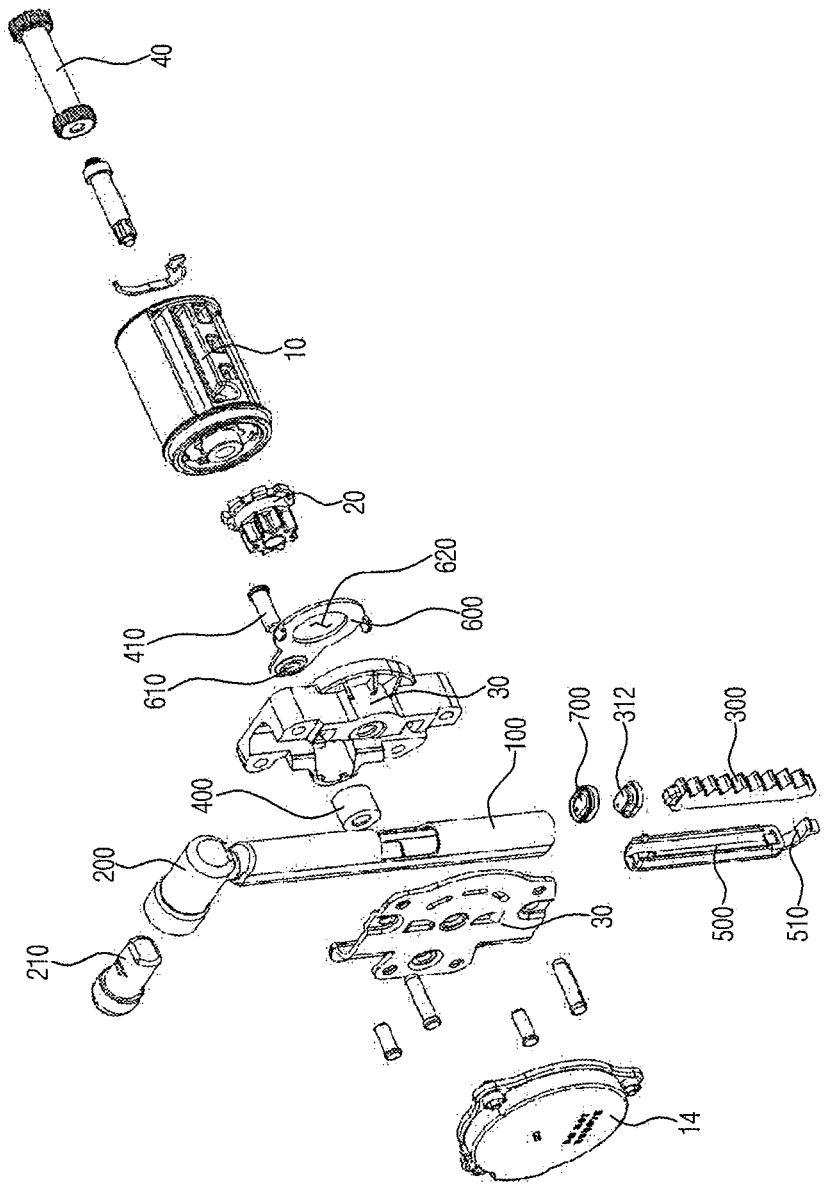
【Figure 1】

[Figure 2]
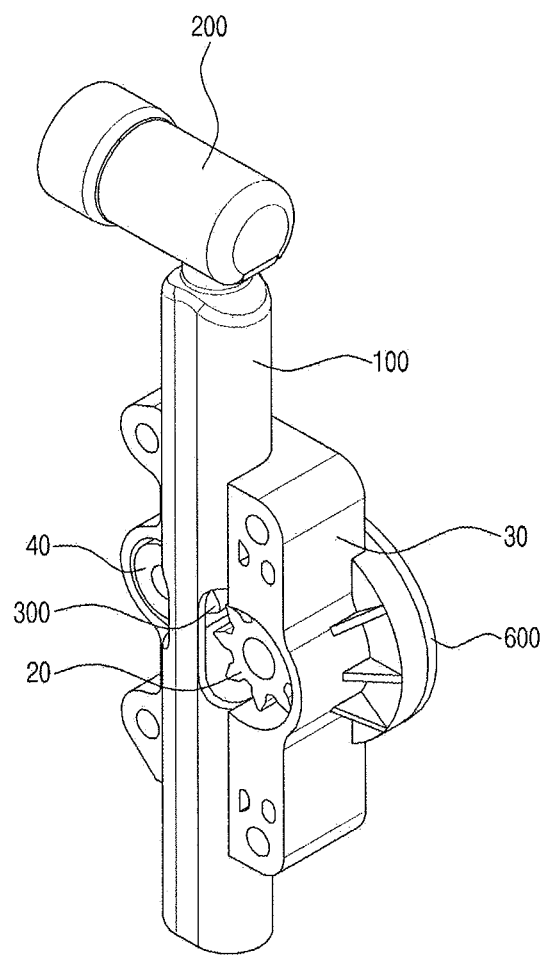

[Figure 3]
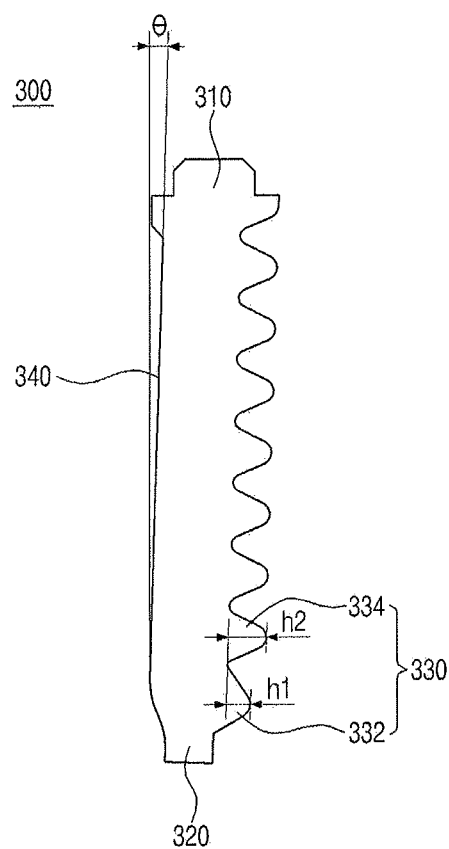

[Figure 4]
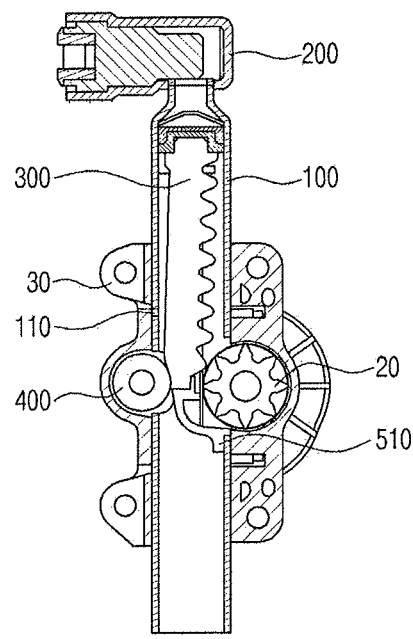
[Figure 5]
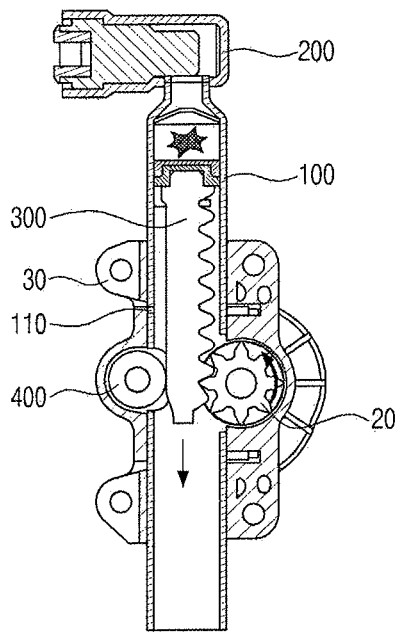

[Figure 6]
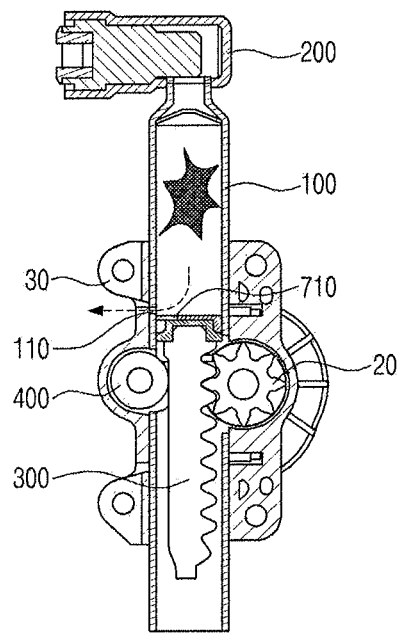
[Figure 7]
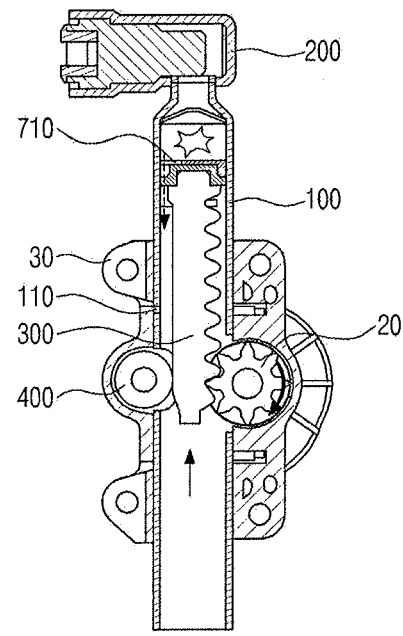

[Figure 8]
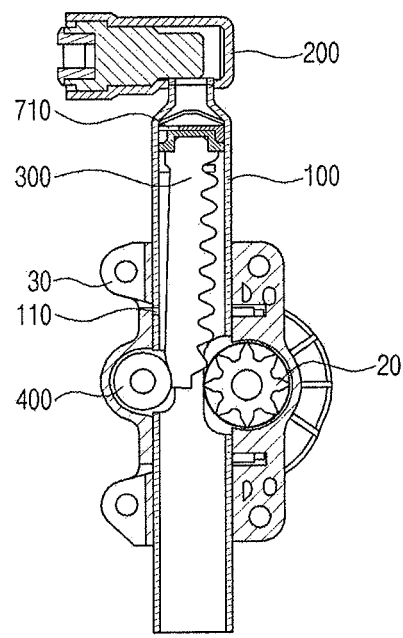
[Figure 9]
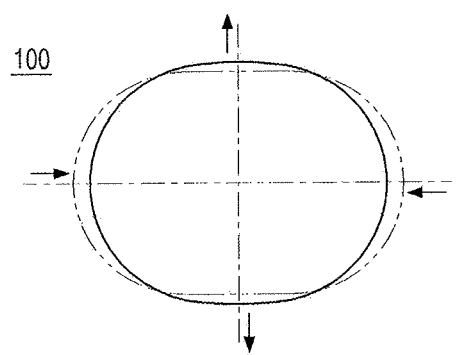

[Figure 10]
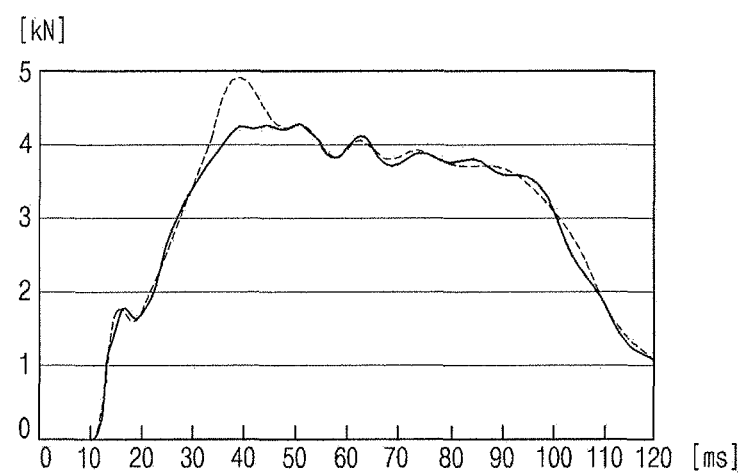

PRETENSIONER

CROSS REFERENCE TO RELATED APPLICATIONS

This application is the U.S. National Phase Application of PCT/KR2011/007894, filed Oct. 21, 2011, which claims priority to Korean Patent Application No. 10-2010-0116787, filed Nov. 23, 2010, the contents of such applications being incorporated by reference herein.

TECHNICAL FIELD

The present invention relates to a pretensioner, and more particularly, to a pretensioner that can more stably transfer a driving force from a micro gas generator to a spool and that can enable an overshoot load not to occur in operation loads of a webbing when operating a load limiter.

BACKGROUND ART

When a person gets in a vehicle or a device, in order to prevent a passenger from separating from the vehicle or the device by collision between vehicles or with another object, various safety apparatuses are provided.

One typical safety apparatus among the various apparatuses is a seat belt, and the seat belt stably fixes the abdominal region and the breast of a passenger that gets in the vehicle or the device to a seat. However, as a result of a large collision between vehicles or with another object, even if a passenger wears a seat belt, the passenger is often wounded.

Therefore, various technology has been developed for a seat belt to exhibit its predetermined function even if a large collision between vehicles or with another object occurs. One such technology among various technology that has recently come to the fore is a pretensioner for improving a function and effect of a seat belt by introducing a webbing to the seat belt when a collision occurs between vehicles or when a vehicle collides with another object.

The pretensioner generally moves a rack adjacent to a micro gas generator (MGG) with a driving force generated in the MGG and rotates a pinion connected to a spool and thus introduces the webbing wound in the spool.

In this case, in order for the rack to rotate a pinion while moving, the rack and the pinion engage and thus at a first time point of starting transfer of a driving force from the MGG, a strong force is transferred to the pinion and thus the pinion may be deformed or broken. When the pinion is deformed or broken, a problem that the pretensioner cannot stably transfer a driving force to the spool occurs.

Further, the MGG generally uses explosive power obtained by exploding gunpowder therein as a driving force, but because gas generated while gunpowder explodes is not completely discharged, when operating a load limiter, a problem that an overshoot load occurs in operation loads of a webbing may occur.

That is, after the pretensioner operates, even if a webbing is locked by an emergency locking retractor (ELR) operating part, an operation load of the webbing is applied to a passenger by an inertial force, and the operation load of the webbing continuously increases and thus the passenger may be wounded. The load limiter appropriately withdraws a webbing to prevent the injury, but when gas is not completely discharged from the pretensioner, as described above, movement of the rack is disturbed and thus a rotation of the pinion connected to the spool is also disturbed, whereby withdrawing of the webbing is disturbed. Due to disturbance of withdrawing of the webbing, an overshoot load occurs in operation loads of the webbing generated when operating the load limiter, which is the above-described problem.

DISCLOSURE OF INVENTION

Technical Problem

The present invention has been made in view of the above problems, and provides a pretensioner that can more stably transfer a driving force from an MGG to a spool and that can is enable an overshoot load not to occur in operation loads of a webbing when operating a load limiter.

The present invention is not limited to the above-described aspects and other aspects will be understood by those skilled in the art from the following description.

Solution to Problem

In an aspect of the present invention, a pretensioner for introducing a webbing wound in a spool by explosive power obtained by exploding gunpowder when an impact is applied from the outside is described, the pretensioner includes: a cylinder being hollow and having one side surface for inserting a portion of a pinion connected to the spool; a micro gas generator (MGG) mounted in an upper end portion of the cylinder and for transferring explosive power into the cylinder while gunpowder provided at the inside explodes when an impact is applied from the outside; a rack mounted in a length direction at the inside passage of the cylinder and having one end portion disposed toward the MGG and having the other end portion disposed opposite to the pinion and having gear teeth provided in one side surface separated not to engage with the pinion before receiving explosive power from the MGG; and a roller rotatably mounted at the other side surface opposite to one side surface of the cylinder so that the gear teeth of the rack engage with the pinion when the rack receives explosive power from the MGG and falls toward a lower end portion of the cylinder and for guiding the separated rack to move toward the pinion.

Before receiving explosive power from the MGG, by separating the gear teeth of the rack from the pinion, the rack may be prevented from disturbing a rotation of the pinion due to introduction or withdrawing of the webbing before receiving explosive power from the MGG.

As the other end portion of the rack is mounted within the cylinder by being inclined toward the roller, before receiving explosive power from the MGG, the gear teeth of the rack and the pinion may be separated.

The other side surface of the rack opposite to one side surface having the gear teeth may be disposed to slide while contacting with the roller, and when the rack receives explosive power from the MGG and falls toward a lower end portion of the cylinder, the other end portion of the rack may be guided to incline toward the pinion from one end portion of the rack by the roller and thus the gear teeth of the rack may engage with the pinion.

In order to guide the other end portion of the rack to incline toward the pinion from one end portion of the rack by the roller, the other side surface of the rack corresponding to the other end portion of the rack may be curved to correspond to an outer circumferential surface of the roller.

The gear teeth provided in one side surface of the rack opposite to the curved other side surface of the rack may have a height lower than other gear teeth provided in the one side surface of the rack.

When the gear teeth of the rack engage with the pinion and transfer explosive power received from the MGG to the pinion, the other end portion of the rack may no longer incline toward the pinion and vertically fall toward a lower end portion of the cylinder.

As the roller enables the other side surface of the rack to slide while rotating, friction between the rack and the roller occurring when the other end portion of the rack is inclined toward the pinion from one end portion of the rack, or vertically falls toward the lower end portion of the cylinder may be reduced.

The pretensioner may further include a rack guide provided along an inner circumferential surface of the cylinder and for guiding the other end portion of the rack to incline toward the pinion from one end portion of the rack, or to vertically fall toward the lower end portion of the cylinder.

Before receiving explosive power from the MGG, in order to prevent the other end portion of the rack from falling toward the lower end portion of the cylinder, the rack guide may have a separation prevention portion in a lower end portion thereof.

In order for the roller not to separate from the other side surface of the cylinder while rotating, a frame for fixing a rotation shaft of the roller may be provided in an outer side portion of the cylinder, and the frame may support the pinion inserted into one side surface of the cylinder and thus reduce vibration generated when the pinion rotates while engaging with the gear teeth of the rack.

In order to transfer a pressure of gas generated when gunpowder provided within the MGG explodes to the rack as explosive power, an O-ring for preventing the generated gas from moving to a lower end portion of the cylinder may be mounted in one end portion of the rack, and in order to discharge the gas after explosive power may be transferred from the MGG to the rack and the rack falls to a lower end portion of the cylinder, a discharge hole may be formed in a side surface portion of the cylinder.

In order to discharge the remaining gas existing within the cylinder, when the rack rises again to an upper end portion of the cylinder after the gas is discharged through the discharge hole, a gas discharge hole may be formed in the O-ring.

As the rack falls to the lower end portion of the cylinder, when the O-ring is positioned at a side surface portion of the cylinder in which the discharge hole is formed, the gas discharge hole may be formed by deterioration by gas discharged through the discharge hole.

The cylinder may be formed in an oval-shaped section having a long radius in a direction of one side surface into which the pinion is inserted and a direction of the other side surface having the roller, and as both surfaces of the cylinder opposite to the long radius are bent by gas generated when gunpowder provided within the MGG explodes, the long radius of the cylinder may reduce and a short radius of the cylinder may increase, and thus when the rack rises again to an upper end portion of the cylinder after the gas is discharged through the discharge hole, the remaining gas existing within the cylinder may be discharged.

Advantageous Effects of Invention

In a pretensioner according to an exemplary embodiment of the present invention, by adjusting a distance between a rack and a pinion, a driving force can be more stably transferred from an MGG to a spool.

Further, as gas generated after gunpowder is exploded in the MGG is completely discharged, an overshoot load does not occur in operation loads of a webbing when operating a load limiter.

BRIEF DESCRIPTION OF DRAWINGS

The accompany drawings, which are included to provide a further understanding of this document and are incorporated in and constitute a part of this specification illustrate embodiments of this document and together with the description serve to explain the principles of this document.

FIG. 1 is an exploded perspective view illustrating a pretensioner and some elements of a retractor for a seat belt including the same according to an exemplary embodiment of the present invention;

FIG. 2 is a coupled perspective view illustrating a pretensioner according to an exemplary embodiment of the present invention;

FIG. 3 is a top plan view illustrating a rack included in a pretensioner according to an exemplary embodiment of the present invention;

FIGS. 4 to 8 are cross-sectional views sequentially illustrating a process of operating a pretensioner according to an exemplary embodiment of the present invention;

FIG. 9 is a cross-sectional view illustrating a change state of a transverse cross-section of a cylinder included in a pretensioner according to an exemplary embodiment of the present invention; and FIG. 10 is a graph illustrating an operation load of a webbing on a time zone basis in a retractor for a seat belt including a pretensioner according to an exemplary embodiment of the present invention.

DESCRIPTION OF REFERENCE NUMERALS

10: spool
14: return spring assembly
20: pinion
30: assembly device
40: torsion bar
100: cylinder
200: micro gas generator
210: gunpowder portion
300: rack
310: one end portion of rack
320: the other end portion of rack
330: gear teeth of rack
400: roller
410: rotation shaft of roller
500: rack guide
510: separation prevention portion
600: frame
610: first hole
620: second hole
700: O-ring

MODE FOR THE INVENTION

Hereinafter, exemplary embodiments of the present invention are described in detail with reference to the accompanying drawings. Detailed descriptions of well-known functions and structures incorporated herein may be omitted to avoid obscuring the subject matter of the present invention.

First, a configuration of a pretensioner according to an exemplary embodiment of the present invention will be described with reference to FIGS. 1 to 3.

Here, FIG. 1 is an exploded perspective view illustrating a pretensioner and some elements of a retractor for a seat belt including the same according to an exemplary embodiment of the present invention, FIG. 2 is a coupled perspective view illustrating a pretensioner according to an exemplary embodiment of the present invention, and FIG. 3 is a top plan view illustrating a rack included in a pretensioner according to an exemplary embodiment of the present invention.

As shown in FIGS. 1 to 3, the pretensioner according to an exemplary embodiment of the present invention includes a cylinder 100, an MGG 200, a rack 300, and a roller 400.

The cylinder 100 is a constituent element provided to dispose constituent elements of a pretensioner according to an exemplary embodiment of the present invention and is formed in a hollow pipe shape.

That is, the cylinder 100 inserts the rack 300 therein and provides space for moving the rack 300 in a length direction of the cylinder 100, and the MGG 200 is mounted in an upper end portion thereof. Further, a hole for positioning a pinion 20 and the roller 400 opposite within the cylinder 100 is formed in both side portions of the cylinder 100 and the cylinder 100 has the discharge hole 110 for discharging gas generated in the MGG 200 in a side portion thereof.

Further, the cylinder 100 having the above-described configuration has an oval-shaped section. As described later, when the rack 300 rises again to an upper end portion of the cylinder 100, this is to easily completely discharge the remaining gas existing within the cylinder 100.

That is, a cross-section of the cylinder 100 may be formed in other shapes such as a circle and a quadrangle, but when a cross-section of the cylinder 100 is formed in an oval shape, even if the same pressure is applied within the cylinder 100, a stress concentration portion changes and thus an oval shape is advantageous in view of easy change of an external form of the cylinder 100. In this case, due to an easy change of an external form of the cylinder 100, the remaining gas existing within the cylinder 100 can be easily discharged to a lower end portion of the cylinder 100 through a gap generated when an external form of the cylinder 100 is changed, and a detailed description thereof will be described together when describing later operation of a pretensioner according to an exemplary embodiment of the present invention.

Here, an oval-shaped section of the cylinder 100 is formed to have a long radius in a direction of one side surface into which the pinion 20 is inserted and a direction of the other side surface having the roller 400, and this is to easily make the other end portion 320 of the rack 300 to be inclined toward the roller 400, as described later.

When a vehicle having a pretensioner according to an exemplary embodiment of the present invention collides, i.e. when an impact is applied from the outside to a vehicle, the MGG 200 generates a driving force necessary for introducing a webbing (not shown).

That is, the MGG 200 is mounted in an upper end portion of the cylinder 100, and when an impact is applied from the outside, the MGG 200 generates explosive power by exploding gunpowder of a gunpowder portion 210 provided therein. In this case, explosive power operates as a driving force transferred to the inside of the cylinder 100.

Specifically, by explosive power generated in the MGG 200, as described later, the rack 300 mounted in an upper part of the inside of the cylinder 100 moves to a lower part, and the pinion 20 engaging with gear teeth 330 of the rack 300 rotates together with a spool 10, and a webbing (not shown) wound in the spool 10 is introduced.

The rack 300 transfers explosive power generated in the MGG 200 to the pinion 20 as a driving force for introducing the webbing (not shown), as described above.

The rack 300 is formed in a bar shape to be mounted in a length direction within the cylinder 100. In this case, one end portion 310 thereof is disposed toward an upper end portion of the cylinder 100, i.e. the MGG 200, and the other end portion 320 thereof is disposed toward a lower end portion of the cylinder 100 and is disposed opposite to the pinion 20.

Further, the rack 300 has the gear teeth 330 engaging with the pinion 20 at one side surface opposite to the other side surface contacting with the roller 400 to be described later. In this case, before the rack 300 receives explosive power from the MGG 200, the gear teeth 330 are separated not to engage with the pinion 20.

Before the rack 300 receives explosive power from the MGG 200, separation of the gear teeth 330 and the pinion 20 is to prevent the rack 300 from disturbing a rotation of the pinion 20 with introduction and withdrawing of the webbing before the rack 300 receives explosive power from the MGG 200, i.e. before a vehicle collides. When the gear teeth 330 and the pinion 20 engage before explosion of the MGG 200, a rotation of the pinion 20 is disturbed by the gear teeth 330, and thus in order to detach a seat belt, when a user introduces or withdraws the webbing (not shown), considerable inconvenience is expected.

A method of separating the gear teeth 330 and the pinion 20 before receiving explosive power from the MGG 200 may include various methods such as a method of transferring explosive power generated from the MGG 200 to the pinion 20.

However, for a more detailed description, for example, a method of mounting the other end portion 320 of the rack 300 to be inclined toward the roller 400 within the cylinder 100 is described.

As described above, when the cylinder 100 is formed to have an oval-shaped section, with respect to a long radius of an oval within the cylinder 100, one end portion 310 of the rack 300 is disposed at one point of a long radius and the other end portion 320 of the rack 300 falls in a diagonal direction from one point of a long radius and is disposed at the opposite other point. In this case, a position of the other point in a long radius of an oval is disposed adjacent to the roller 400, and thus the other end portion 320 of the rack 300 is mounted to be inclined toward the roller 400.

While the rack 300 mounted in this way receives explosive power from the MGG 200 and falls toward a lower end portion of the cylinder 100, the other end portion 320 of the rack 300 advancing toward the roller 400 is inclined toward the pinion 20 while rotating about one end portion 310 of the rack 300. In this way, as one end portion 310 of the rack 300 inclines in a direction opposite to a direction inclining toward the center, when the rack 300 falls toward a lower end portion of the cylinder 100, the gear teeth 330 of the rack 300 engage with the pinion 20 and thus explosive power generated in the MGG 200 is transferred to the pinion 20.

When describing this in an x-y coordinate, if a length direction of the cylinder 100 is defined as a y-axis and a virtual line, which is perpendicular to the y-axis as a line connecting the pinion 20 and the roller 400 mounted in both side portions of the cylinder 100 is defined as an x-axis, an x-coordinate of one end portion 310 of the rack 300 is fixed and a y-coordinate thereof is changed, but an x-coordinate of the other end portion 320 of the rack 300 is changed together with a y-coordinate thereof.

In other words, while the rack 300 moves to gradually reduce an angle θ shown in FIG. 3, the gear teeth 330 of the rack 300 and the pinion 20 engage.

Although movement of the rack 300 may be guided through a rack guide 500 to be described later, there is a high possibility in which a friction occurs between the rack 300 and the rack guide 500, and thus a pretensioner according to an exemplary embodiment of the present invention includes the roller 400.

That is, the roller 400 guides to engage the gear teeth 330 of the rack 300 with the pinion 20 when the rack 300 receives explosive power from the MGG 200 falls toward a lower end portion of the cylinder 100.

The roller 400 is rotatably mounted in the other side surface opposite to one side surface of the cylinder 100 into which a portion of the pinion 20 is inserted. That is, while the roller 400 rotates, the rack 300 performs a sliding movement and thus moves within the cylinder 100. In this way, because movement of the rack 300 is guided by a sliding movement, friction that may occur when guiding movement of the rack 300 is reduced.

As a method of guiding the other end portion 320 of the rack 300 to incline toward the pinion 20 from one end portion 310 thereof by the roller 400, a shape of the roller 400 may be formed in a cam shape having different radiuses instead of a circle having a constant radius. However, in this case, because space in which the roller 400 is mounted within the cylinder 100 can be largely provided, a shape of the rack 300 first contacting with the roller 400 can be changed.

That is, the other side surface 340 of the rack 300 corresponding to the other end portion 320 of the rack 300 may be curved to correspond to an outer circumferential surface of the roller 400. When a shape of the other side surface 340 of the rack 300 corresponding to the other end portion 320 of the rack 300 is changed, the other end portion 320 of the rack 300 may be inclined toward the pinion 20 to appropriate space according to guide of the roller 400 rather than a change of a shape of the roller 400.

In this way, when the other end portion 320 of the rack 300 moves toward the pinion 20 from the roller 400, an impact may occur at a time point in which the gear teeth 330 of the rack 300 and the pinion 20 engage, and when an impact amount is large, the gear teeth 330 of the rack 300 or the pinion 20 may be damaged.

A method of preventing an impact when the gear teeth 330 of the rack 300 and the pinion 20 engage may include a method of making a height h1 of a first gear tooth 332 first engaging with the pinion 20 among the gear teeth 330 of the rack 300 to be lower than a height h2 of a second tooth 334, as shown in detail in FIG. 3.

That is, the gear tooth 332 provided in one side surface of the rack 300 opposite to the other side surface 340 of the curved rack 300 is formed to have a height lower than another gear tooth 334 provided in one side surface of the rack 300.

After the gear teeth 330 of the rack 300 engage with the pinion 20, when transferring explosive power received from the MGG 200, if the other end portion 320 of the rack 300 is continuously inclined while rotating about one end portion 310, the other end portion 320 continuously receives a force in the inclined direction and thus a force other than a driving force transferred between the gear teeth 330 of the rack 300 and the pinion 20 additionally operates.

Additional operation of such a force causes unexpected damage of the gear teeth 330 or the pinion 20, and in order to solve this, after the gear teeth 330 of the rack 300 engage with the pinion 20, when the gear teeth 330 of the rack 300 transfer explosive power received from the MGG 200, the other end portion 320 of the rack 300 is formed to be no longer inclined toward the pinion 20 and to vertically fall toward a lower end portion of the cylinder 100.

As described above, a configuration of differently forming a height of the gear teeth 330 or a configuration in which the rack 300 falls toward a lower end portion of the cylinder 100 after the gear teeth 330 engage with the pinion 20 performs a function of softly transferring a driving force when transferring a driving force generated in the MGG 200 to the pinion 20 in addition to prevention of damage of the gear teeth 330 of the rack 300 and the pinion 20, and this becomes apparent to those skilled in the art.

A pretensioner according to an exemplary embodiment of the present invention further includes a rack guide 500 for guiding movement of the rack 300.

That is, the rack guide 500 guides the other end portion 320 of the rack 300 to incline toward the pinion 20 from one end portion 310 thereof or to vertically fall toward a lower end portion of the cylinder 100. The rack guide 500 is provided along an inner circumferential surface of the cylinder 100, is formed in a shape enclosing a periphery of the rack 300, and has a separation prevention portion 510 in a lower end portion thereof.

In this case, the separation prevention portion 510 performs a function of preventing the other end portion 320 of the rack 300 from falling toward a lower end portion of the cylinder 100 before receiving explosive power from the MGG 200. The separation prevention portion 510 for performing such a function is protruded from the rack guide 500 to support the other end portion 320 of the rack 300 and should have appropriate strength not to disturb the other end portion 320 of the rack 300 when the other end portion 320 of the rack 300 falls.

The pretensioner according to an exemplary embodiment of the present invention further includes a frame 600 for fixing a rotation shaft 410 of the roller 400.

In this case, a frame 600 is mounted in an assembly device 30 provided in an outer side portion of the cylinder 100 and includes a first hole 610 through which the rotation shaft 410 of the roller 400 passes and a second hole 620 through which the pinion 20 passes.

The frame 600 having such a configuration fixes the rotation shaft 410 of the roller 400 and thus performs a function of preventing the roller 400 from separating from the other side surface of the cylinder 100 while rotating. Further, the frame 600 supports the pinion 20 inserted into one side surface of the cylinder 100 by passing through the frame 600 in addition to such a function and thus performs a function of reducing a vibration generated when the pinion 20 rotates while engaging with the gear teeth 330.

As the pretensioner according to an exemplary embodiment of the present invention further includes the frame 600 for performing such a function, the pretensioner has far superior performance than existing pretensioners in view of noise and vibration.

The assembly device 30 can be manufactured to correspond to a size and shape of a retractor for a seat belt in which the pretensioner according to an exemplary embodiment of the present invention is mounted. The pretensioner according to exemplary embodiment of the present invention has an organic coupling relationship from a return spring assembly 14 shown at the leftmost side of FIG. 1 to a torsion bar 40 shown at the rightmost side of FIG. 1 based on the assembly device 30.

A pretensioner that can more stably transfer a driving force from the MGG 200 to the spool 10 among subjects to be solved by the present invention is obtained by constituent elements of the pretensioner according to an exemplary embodiment of the present invention.

However, when operating the load limiter, it is not easy to prevent an overshoot load (an initially abruptly rising load in operation loads of the webbing (not shown) due to an overshoot phenomenon occurring in an initial operation of the load limiter) from occurring in operation loads of the webbing (not shown) with only the constituent elements, and a discharge hole 110 and a gas discharge hole 710 described hereinafter are necessary.

That is, the pretensioner according to an exemplary embodiment of the present invention further includes an Q-ring 700 in which the discharge hole 110 and the gas discharge hole 710 are formed.

First, the discharge hole 110 will be described, and the discharge hole 110 is formed in a side surface portion of the cylinder 100 and is a hole for communicating the inside and outside of the cylinder 100, and as explosive power is transferred from the MGG 200 to the rack 300, the rack 300 falls to a lower end portion of the cylinder 100 and then the discharge hole 110 performs a function of discharging gas generated when gunpowder within the gunpowder portion 210 of the MGG 200 explodes.

When the rack 300 completely falls toward a lower end portion of the cylinder 100, the discharge hole 110 is formed in a side surface portion of the cylinder 100 to correspond to a point at which one end portion 310 of the rack 300 is positioned. This is because a pressure of gas is weakened when gas is discharged before a pressure of gas generated when gunpowder explodes within the gunpowder portion 210 of the MGG 200 is transferred to the rack 300 as explosive power. Further, as described later, this is because it is advantageous to form the gas discharge hole 710 in the O-ring 700.

The O-ring 700 is a ring-shaped element mounted in one end portion 310 of the rack 300 using a connecting member 312 as an intermediary and performs a function of preventing the generated gas from flowing to a lower end portion of the cylinder 100 so that a pressure of gas generated when gunpowder within the gunpowder portion 210 of the MGG 200 explodes is transferred to the rack 300 as explosive power.

However, after a pressure of gas is transferred to the rack 300 as explosive power, when the rack 300 moves again toward an upper end portion of the cylinder 100, in order to easily discharge the remaining gas existing within the cylinder, the gas discharge hole 710 is formed in the O-ring 700.

That is, after gas is discharged through the discharge hole 110, when the rack 300 rises again to an upper end portion of the cylinder, it is difficult to discharge gas through the discharge hole 110 by the risen rack 300, and thus the remaining gas exists within the cylinder 100, and the gas discharge hole 710 performs a function of discharging the remaining gas.

The gas discharge hole 710 may be voluntarily formed in relation to a structure of the O-ring 700 according to a moving direction of the rack 300, but in this case, there is a defect that a structure of the O-ring 700 becomes complicated and a production cost much increases, and in order to overcome such a defect, a heat and pressure of gas discharged through the discharge hole 110 can be used.

That is, the rack 300 falls to a lower end portion of the cylinder 100, and when the O-ring 700 is positioned at a side surface portion of the cylinder 100 in which the discharge hole 110 is formed, the gas discharge hole 710 is formed by deterioration of gas discharged through the discharge hole 110.

In this way, when gas existing within the cylinder 100 is completely removed through the discharge hole 110 and the gas discharge hole 710, if the load limiter operates, the load limiter is not disturbed by the remaining gas existing within the cylinder 100, and an overshoot load (an initially abruptly rising load an operation loads of the webbing (not shown) due to an overshoot phenomenon occurring in an initial operation of the load limiter) in operation loads of the webbing (not shown) is removed.

Hereinafter, operation of a pretensioner according to an exemplary embodiment of the present invention will be described with reference to FIGS. 4 to 10.

Here, FIGS. 4 to 8 are cross-sectional views sequentially illustrating a process of operating a pretensioner according to an exemplary embodiment of the present invention, FIG. 9 is a cross-sectional view illustrating a change state of a transverse cross-section of a cylinder included in a pretensioner according to an exemplary embodiment of the present invention, and FIG. 10 is a graph illustrating an operation load of the webbing on a time zone basis in a retractor for a seat belt including a pretensioner according to an exemplary embodiment of the present invention.

First, as shown in FIG. 4, before a vehicle collides, the rack 300 is mounted to incline toward the roller 400 within the cylinder 100. In this case, when the webbing (not shown) is introduced or withdrawn by a user's intention, the gear teeth 330 of the rack 300 are separated from the pinion 20 not to disturb a rotation of the pinion 20. In order to prevent the rack 300 from falling to a lower end portion of the cylinder 100 without operation of the MGG 200, the separation prevention portion 510 fixes a lower end portion of the rack 300.

However, as shown in FIG. 5, when a vehicle collides, the rack 300 starts to fall to a lower end portion of the cylinder 100 by operation of the MGG 200. In this case, while the roller 400 rotates, the roller 400 guides movement of the rack 300 so that the gear teeth 330 of the rack 300 engage with the pinion 20. In this case, an area in which a first gear tooth 332 of the gear teeth 330 and the pinion 20 engage is smaller than an area in which a second gear tooth 334 of the gear teeth 330 and the pinion 20 engage, and thus unexpected damage of the gear teeth 330 is prevented and a driving force is softly transferred from the rack 300 to the pinion 20. Further, even after the gear teeth 330 and the pinion 20 engage, the rack 300 is no longer inclined toward the pinion 20 and vertically falls toward a lower end portion of the cylinder 100.

Therefore, as shown in FIG. 6, when the rack 300 completely falls toward a lower end portion of the cylinder 100, gas generated by operation of the MGG 200 is discharged through the discharge hole 110. In this case, a portion of the O-ring 700 adjacent to the discharge hole 110 is deteriorated by the discharged gas, and thus the gas discharge hole 710 is formed in the O-ring 700.

In this way, when the rack 300 rotates the pinion 20 counterclockwise in the drawing while falling, the webbing (not shown) is introduced and thus a vehicle passenger wearing a seat belt is prevented from separating. However, because a limitation exists in continuously preventing separation of the vehicle passenger by such a method, the webbing (not shown) is locked to be no longer withdrawn from the retractor for the seat belt. In this way, even after locking, the vehicle passenger gradually withdraws the webbing (not shown) while continuously receiving a load by inertia, and in this case, when withdrawing of the webbing (not shown) is disturbed, a continuously received load may aggravate injury of the vehicle passenger.

Therefore, withdrawing of the webbing (not shown) is somewhat secured through the load limiter, and in this case, the pinion 20 rotates clockwise, as shown in FIG. 7 and thus the rack 300 rises toward an upper end portion of the cylinder 100. In this case, the remaining gas existing without being completely discharged through the discharge hole 110 is completely discharged through the gas discharge hole 710. Although the remaining gas may be entirely discharged through the gas discharge hole 710, some gas may be discharged through a gap generated by deformation of the cylinder 100, as shown in FIG. 9. In this way, when the remaining gas is completely discharged, the MGG 200 is in a state similar to a state before the MGG 200 operates, as shown in FIG. 8.

In the foregoing operation process, it can be confirmed one more time that the remaining gas is completely discharged and thus disturbance by the remaining gas no longer exists in operation of a load limiter described above.

Therefore, an overshoot load (an initially abruptly rising load in operation loads of the webbing (not shown) due to an overshoot phenomenon occurring in an initial operation of the load limiter) does not occur in the operation loads of the webbing (not shown), and as shown in FIG. 10, in a webbing (not shown) operating load graph in an existing pretensioner indicated by a dotted line, an overshoot load represented in 40 [ms] zone is removed, as in a webbing (not shown) operation load graph in a pretensioner according to an exemplary embodiment of the present invention indicated by a solid line.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A pretensioner for introducing a webbing wound in a spool by explosive power obtained by exploding gunpowder when an impact is applied from the outside, the pretensioner comprising:
    a cylinder being hollow and having a passage and a first side surface for inserting a portion of a pinion connected to the spool;
    a micro gas generator (MGG) mounted in an upper end portion of the cylinder and for transferring explosive power into the cylinder while gunpowder provided at the inside explodes when an impact is applied from the outside;
    a rack mounted within the passage of the cylinder and having an upper end portion disposed toward the MGG and having a lower end portion disposed opposite to the pinion and having gear teeth provided in a first side surface separated not to engage with the pinion before receiving explosive power from the MGG, the rack further comprising a second side surface opposite to the first side surface; and
    a roller rotatably mounted at a second side surface of the cylinder opposite to the first side surface of the cylinder for engaging with the second side surface of the rack so that the gear teeth of the rack engage with the pinion when the rack receives explosive power from the MGG and falls toward a lower end portion of the cylinder and guiding the separated rack to rotate within the cylinder and move toward the pinion,
    a curve on the lower end portion of the second side surface of the rack, and the curve corresponds to an outer circumferential surface of the roller in order to guide the lower end portion of the rack to incline toward the pinion as the rack falls toward the lower end portion of the cylinder,
    wherein before receiving explosive power from the MGG, the second side surface of the rack is angled within the passage of the cylinder and the roller rests on the curve on the lower portion of the rack, and after receiving explosive power from the MGG, the rack rotates as the curve of the rack travels over the roller so that the second side surface of the rack is substantially straight within the passage of the cylinder.

2. The pretensioner of claim 1, wherein before receiving explosive power from the MGG, by separating the gear teeth of the rack from the pinion, the rack is prevented from disturbing a rotation of the pinion due to introduction or withdrawing of the webbing before receiving explosive power from the MGG.

3. The pretensioner of claim 2, wherein as the lower end portion of the rack is mounted within the cylinder by being inclined toward the roller, before receiving explosive power from the MGG, the gear teeth of the rack and the pinion are separated.

4. The pretensioner of claim 3, wherein the second side surface of the rack opposite to the first side surface of the rack having the gear teeth is disposed to slide while contacting with the roller, and
    when the rack receives explosive power from the MGG and falls toward the lower end portion of the cylinder, the lower end portion of the rack is guided to incline toward the pinion by the roller and thus the gear teeth of the rack engage with the pinion.

5. The pretensioner of claim 4, wherein when the gear teeth of the rack engage with the pinion and transfer explosive power received from the MGG to the pinion, the lower end portion of the rack no longer inclines toward the pinion and vertically falls toward the lower end portion of the cylinder.

6. The pretensioner of claim 5, wherein as the roller enables the second side surface of the rack to slide while rotating, friction between the rack and the roller occurring when the lower end portion of the rack is inclined toward the pinion, or vertically falls toward the lower end portion of the cylinder is reduced.

7. The pretensioner of claim 5, further comprising a rack guide provided along an inner circumferential surface of the cylinder and for guiding the lower end portion of the rack to incline toward the pinion, or to vertically fall toward the lower end portion of the cylinder.

8. The pretensioner of claim 7, wherein before receiving explosive power from the MGG, in order to prevent the lower end portion of the rack from falling toward the lower end portion of the cylinder, the rack guide has a separation prevention portion in a lower end portion thereof.

9. The pretensioner of claim 5, wherein in order for the roller not to separate from the second side surface of the cylinder while rotating, a frame for fixing a rotation shaft of the roller is provided in an outer side portion of the cylinder, and the frame supports the pinion inserted into the first side surface of the cylinder and thus reduces vibration generated when the pinion rotates while engaging with the gear teeth of the rack.

10. The pretensioner of claim 2, wherein in order to transfer a pressure of gas generated when gunpowder provided within the MGG explodes to the rack as explosive power, an O-ring for preventing the generated gas from moving to the lower end portion of the cylinder is mounted in the upper end portion of the rack, and a discharge hole is formed in the cylinder in order to discharge the gas after explosive power is transferred from the MGG to the rack and the rack falls to the lower end portion of the cylinder.

11. The pretensioner of claim 10, wherein a gas discharge hole is formed in the O-ring in order to discharge the remaining gas existing within the cylinder when the rack rises again to the upper end portion of the cylinder after the gas is discharged through the discharge hole.

12. The pretensioner of claim 11, wherein as the rack falls to the lower end portion of the cylinder, the gas discharge hole is formed in the O-ring when the O-ring registers with the discharge hole of the cylinder by deterioration by gas discharged through the discharge hole.

13. The pretensioner of claim 10, wherein the cylinder is formed in an oval-shaped section having a long radius in a direction of the first side surface of the cylinder into which the pinion is inserted and a direction of the second side surface having the roller, and as both side surfaces of the cylinder opposite to the long radius are bent by gas generated when gunpowder provided within the MGG explodes, the long radius of the cylinder reduces and a short radius of the cylinder increases, such that the remaining gas existing within the cylinder is discharged, when the rack rises again to the upper end portion of the cylinder after the gas is discharged through the discharge hole.

14. The pretensioner of claim 1, wherein at least one gear tooth provided in the first side surface of the rack opposite to the curved second side surface of the rack has a height lower than other gear teeth provided in the first side surface of the rack.

* * * * *